US012646233B2

(12) United States Patent
Farré Guiu

(10) Patent No.: US 12,646,233 B2
(45) Date of Patent: Jun. 2, 2026

(54) CROSS-DOMAIN CONTENT BLENDING

(71) Applicant: Google LLC, Mountain View, CA (US)

(72) Inventor: Miquel Angel Farré Guiu, Bern (CH)

(73) Assignee: Google LLC, Mountain View, CA (US)

( * ) Notice: Subject to any disclaimer, the term of this patent is extended or adjusted under 35 U.S.C. 154(b) by 239 days.

(21) Appl. No.: 18/701,353

(22) PCT Filed: Jan. 6, 2023

(86) PCT No.: PCT/US2023/010309
§ 371 (c)(1),
(2) Date: Apr. 15, 2024

(87) PCT Pub. No.: WO2024/147792
PCT Pub. Date: Jul. 11, 2024

(65) Prior Publication Data
US 2025/0245889 A1 Jul. 31, 2025

(51) Int. Cl.
| | |
|---|---|
| *G06T 11/60* | (2026.01) |
| *G06T 11/23* | (2026.01) |
| *G06V 10/764* | (2022.01) |
| *G06V 30/413* | (2022.01) |
| *G11B 27/10* | (2006.01) |

(52) U.S. Cl.
CPC .............. *G06T 11/60* (2013.01); *G06T 11/23* (2026.01); *G06V 10/764* (2022.01); *G06V 30/413* (2022.01); *G11B 27/10* (2013.01)

(58) Field of Classification Search
CPC ....... G06T 11/60; G06T 11/23; G06V 10/764; G06V 30/413; G11B 27/10
See application file for complete search history.

(56) References Cited

U.S. PATENT DOCUMENTS 9,411,319 B1 * 8/2016 Matsui ................. G04G 9/0082
10,929,979 B1 * 2/2021 Dimson ............... H04N 21/431
(Continued)

OTHER PUBLICATIONS

International Preliminary Report on Patentability in International Appln. No. PCT/US2023/010309, mailed on Jul. 17, 2025, 7 pages.
(Continued)

*Primary Examiner* — Kenny Nguyen
(74) *Attorney, Agent, or Firm* — Fish & Richardson P.C.

(57) ABSTRACT

Methods, systems, and apparatus, including computer programs encoded on a computer storage medium, for blending content from different domains. A method includes obtaining, from a given content provider, a set of text and a set of images that are designated for combination to create a digital component. A saliency model is applied to an electronic document to identify salient areas in the electronic document. A set of modifications that do not result in the salient areas in the electronic document being overlapped are constructed. Visual characteristics of the electronic document are determined. A request for content to integrate into the electronic document that is provided by a different domain than the digital component is received. Visual modifications are made to the digital component based on (i) the constructed set of modifications and (ii) the determined visual characteristics of the electronic document. The modified digital component is served.

20 Claims, 4 Drawing Sheets

(56)　　　　　　References Cited

U.S. PATENT DOCUMENTS

| | | | | |
|---|---|---|---|---|
| 11,567,572 | B1 * | 1/2023 | Pratt | ....................... G06F 3/011 |
| 12,450,750 | B2 * | 10/2025 | Kumar | .................. G06F 40/109 |
| 2018/0173714 | A1 * | 6/2018 | Moussa | ................. G06F 16/248 |
| 2018/0332167 | A1 * | 11/2018 | Lu | ....................... G06F 16/9535 |
| 2023/0052265 | A1 * | 2/2023 | Pratt | ...................... G06V 40/23 |
| 2023/0168737 | A1 * | 6/2023 | Pratt | ...................... G06V 10/82 |
| | | | | 345/156 |
| 2025/0005763 | A1 * | 1/2025 | Kumar | ...................... G06T 7/13 |

OTHER PUBLICATIONS

Berkner et al., "Adaptation of document images to display constraints." Human Vision and Electronic Imaging XIII, SPIE, Jan. 1, 2008, 68061:C1-10.

Berkner et al., "SmartNails: display-and image-dependent thumbnails." Document Recognition and Retrieval XI. vol. 5296. SPIE, Jan. 21, 2004, 54-65.

International Search Report and Written Opinion in International Appln. No. PCT/US2023/010309, mailed on Jul. 7, 2023, 13 pages.

Zhang et al., "Smarttext: Learning to generate harmonious textual layout over natural image." 2020 IEEE International Conference on Multimedia and Expo (ICME). IEEE, Jul. 2020, 6 pages.

* cited by examiner

300

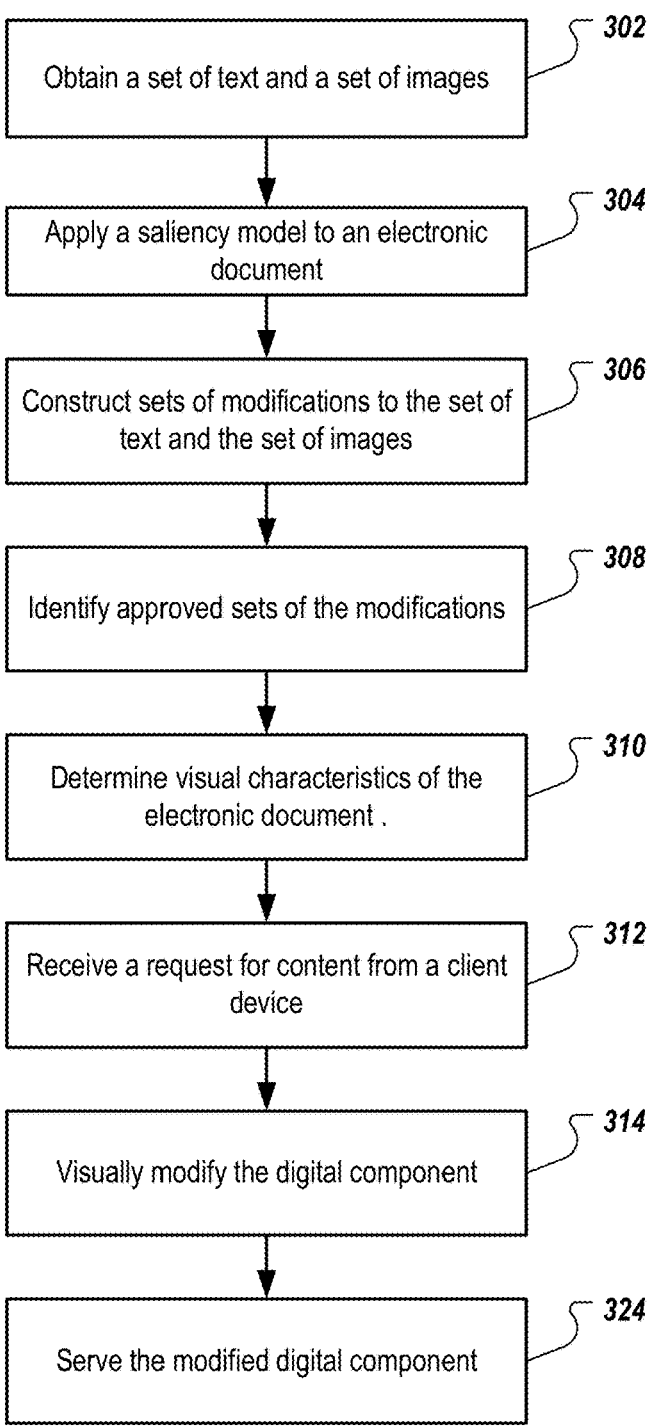

302
Obtain a set of text and a set of images

304
Apply a saliency model to an electronic document

306
Construct sets of modifications to the set of text and the set of images

308
Identify approved sets of the modifications

310
Determine visual characteristics of the electronic document .

312
Receive a request for content from a client device

314
Visually modify the digital component

324
Serve the modified digital component

Processor
410

Memory
420

450

Storage
Device
430

440

Input/Output

460

Peripheral
Devices

CROSS-DOMAIN CONTENT BLENDING

CROSS-REFERENCE TO RELATED APPLICATIONS

This application is a National Stage Application under 35 U.S.C. § 371 and claims the benefit of International Application No. PCT/US2023/010309, filed Jan. 6, 2023. The disclosure of the prior application is considered part of and is incorporated by reference in the disclosure of this application.

BACKGROUND

This specification relates to data processing and blending content from different domains into a combined visual presentation.

SUMMARY

In general, one innovative aspect of the subject matter described in this specification can be embodied in methods that include the actions of obtaining, by one or more processors and from a given content provider, a set of text and a set of images that are designated for combination to create a digital component; applying, by the one or more processors and to an electronic document, a saliency model configured, using at least one machine learning training technique, to accept image data of an image as input and output locations of salient areas in the image; constructing, by the one or more processors, a set of modifications to the set of text or the set of images that do not result in the salient areas in the electronic document being overlapped by the set of text or the set of images; determining, by the one or more data processing apparatus, visual characteristics of the electronic document; after performing the obtaining, applying, constructing, and determining: receiving, from a client device, a request for content to integrate into the electronic document that is provided to the client device by a different domain than the digital component; visually modifying, by the one or more processors and after receiving the request for content, at least one of the set of text or the set of images based a combination of (i) the constructed set of modifications and (ii) the determined visual characteristics of the electronic document; serving, by the one or more processors and in response to receiving the request for content, the digital component to the client device as visually modified by the one or more processors. Other embodiments of this aspect include corresponding systems, apparatus, and computer programs, configured to perform the actions of the methods, encoded on computer storage devices.

These and other embodiments can each optionally include one or more of the following features.

Constructing the set of modifications can include modifying a typography of the set of text according to a given set of modifications; rendering a revised digital component that includes at least one image from among the set of images and at least some text from among the set of text with the modified typography; performing one or more computer vision processes on a presentation of the revised digital component overlaid on the electronic document to determine whether the salient areas of the image are overlapped; and classifying the given set of modifications based on whether the salient areas of the image are overlapped.

Visually modifying at least one of the set of text or the set of images based a combination of (i) the constructed set of modifications and (ii) the determined visual characteristics of the electronic document can include modifying the set of text to match a target typography of the electronic document based on the target typography being classified as acceptable based on the salient areas of the images not being overlapped when modified to the target typography; and serving the digital component to the client device as visually modified by the one or more processors comprises serving the digital component including the target typography of the electronic document.

Constructing the set of modifications can include: modifying a shape of the image to a target shape; rendering the revised digital component with the modified shape of the image; performing a set of computer vision processes on the revised digital component; and classifying the revised digital component based on a result of the set of computer vision processes performed on the revised digital component.

Visually modifying at least one of the set of text or the set of images based a combination of (i) the constructed set of modifications and (ii) the determined visual characteristics of the electronic document can include modifying the shape of the image to the target shape based on the set of computer vision processes indicating that the target shape of the image results in a pre-specified change in distance between the image and the content of the electronic document.

Visually modifying at least one of the set of text or the set of images based a combination of (i) the constructed set of modifications and (ii) the determined visual characteristics of the electronic document can include modifying the shape of the image to the target shape based on one or more characteristics of an intended audience for the digital component.

The digital component can include video content. The method can further include determining, based on the content of the electronic document, a context of the electronic document; determining a location within the video content that corresponds to the context of the electronic document; and beginning playback of the video content at the location rather than a beginning of the video content based on the determination that the location within the video content corresponds to the context of the electronic document.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow chart of an example process 300 for visually blending content from different domains.

Like reference numbers and designations in the various drawings indicate like elements.

DETAILED DESCRIPTION

Figure 1:
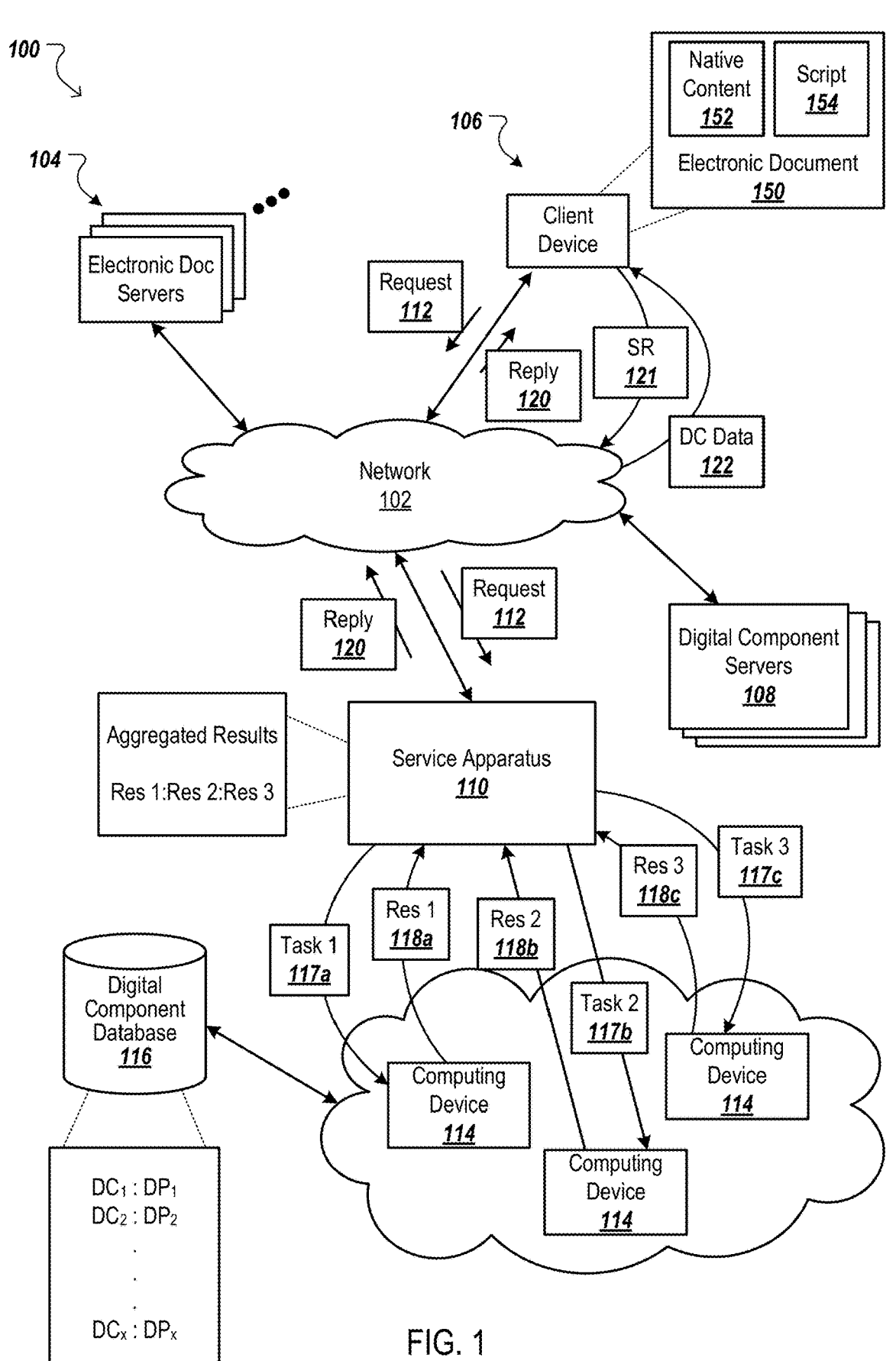
FIG. 1 is a block diagram of an example environment in which cross-domain content blending can be performed.

This specification describes techniques for performing cross-domain content blending. As used throughout this document, cross-domain content blending refers to adjusting content from one domain for presentation with content in another domain. For example, assume that an online resource (e.g., electronic document) from one domain, such as a webpage, application, or another online resource, has been requested for presentation by a client device, and that requested online resource includes a script that requests a digital component (e.g., third-party content) from another domain to be incorporated into the requested online resource to create a final presentation of the combination of the requested online resource and the digital component.

In these situations, it is common for the digital component to have a visual appearance (e.g., look and feel) that is substantially different from the look and feel of the content of the requested online resource because the digital component is generally static in nature, and must be served in the range of 100's of milliseconds, which reduces the ability to modify the digital component prior to serving. This difference in visual appearance can result in a presentation of the combined content (e.g., that of the requested online resource and the digital component) that is aesthetically unappealing, which can negatively affect the user experience, and/or lead to user's quickly navigating to another online resource, which results in wasted bandwidth, battery consumption (e.g., in the case of mobile devices), and other wasted computing resources. Furthermore, the modification of either the online resource or the digital component is even more restricted when the online resource and the digital component are served by servers in different domains and/or controlled by different entities because one entity (or domain) is generally unable to modify the content provided by the other entity (or domain) because of security constraints. For example, the digital component may be presented in a walled garden portion of the online resource (e.g., a frame that is separated from other portions of the online resource). As such, access to the online resource are generally unavailable to the entities providing digital component for presentation with the online resource.

The techniques discussed in this specification enable more robust real-time (e.g., at the time of a content request) modification of the digital component to take on a visual appearance that is more consistent with and/or blend more seamlessly with the content of the requested online resource, so that the combination of content from two different domains/entities appears, to the viewer, as one seamless document, while still serving the digital component within strict time constraints (e.g., 100s of milliseconds), and potentially in a frame (or other user interface environment) that is separated from the requested online resource. This is achieved, for example, by a combination of pre-processing and real-time processing that enables the digital component to be modified based on the visual presentation of the online resource into which the digital component will be integrated.

As used throughout this document, the phrase "digital component" refers to a discrete unit of digital content or digital information (e.g., a video clip, audio clip, multimedia clip, image, text, or another unit of content). A digital component can electronically be stored in a physical memory device as a single file or in a collection of files, and digital components can take the form of video files, audio files, multimedia files, image files, or text files and include advertising information, such that an advertisement is a type of digital component.

FIG. 1 is a block diagram of an example environment 100 in which cross-domain content blending can be performed. The example environment 100 includes a network 102, such as a local area network (LAN), a wide area network (WAN), the Internet, or a combination thereof. The network 102 connects electronic document servers 104, user devices 106, digital component servers 108, and a service apparatus 110. The example environment 100 may include many different electronic document servers 104, user devices 106, and digital component servers 108.

A client device 106 is an electronic device that is capable of requesting and receiving online resources over the network 102. Example client devices 106 include personal computers, gaming devices, mobile communication devices, digital assistant devices, augmented reality devices, virtual reality devices, and other devices that can send and receive data over the network 102. A client device 106 typically includes a user application, such as a web browser, to facilitate the sending and receiving of data over the network 102, but native applications (other than browsers) executed by the client device 106 can also facilitate the sending and receiving of data over the network 102.

A gaming device is a device that enables a user to engage in gaming applications, for example, in which the user has control over one or more characters, avatars, or other rendered content presented in the gaming application. A gaming device typically includes a computer processor, a memory device, and a controller interface (either physical or visually rendered) that enables user control over content rendered by the gaming application. The gaming device can store and execute the gaming application locally, or execute a gaming application that is at least partly stored and/or served by a cloud server (e.g., online gaming applications). Similarly, the gaming device can interface with a gaming server that executes the gaming application and "streams" the gaming application to the gaming device. The gaming device may be a tablet device, mobile telecommunications device, a computer, or another device that performs other functions beyond executing the gaming application.

Digital assistant devices include devices that include a microphone and a speaker. Digital assistant devices are generally capable of receiving input by way of voice, and respond with content using audible feedback, and can present other audible information. In some situations, digital assistant devices also include a visual display or are in communication with a visual display (e.g., by way of a wireless or wired connection). Feedback or other information can also be provided visually when a visual display is present. In some situations, digital assistant devices can also control other devices, such as lights, locks, cameras, climate control devices, alarm systems, and other devices that are registered with the digital assistant device.

As illustrated, the client device 106 is presenting an electronic document 150. An electronic document is data that presents a set of content at a client device 106. Examples of electronic documents include webpages, word processing documents, portable document format (PDF) documents, images, videos, search results pages, and feed sources. Native applications (e.g., "apps" and/or gaming applications), such as applications installed on mobile, tablet, or desktop computing devices are also examples of electronic documents. Electronic documents can be provided to client devices 106 by electronic document servers 104 ("Electronic Doc Servers").

For example, the electronic document servers 104 can include servers that host publisher websites. In this example, the client device 106 can initiate a request for a given publisher webpage, and the electronic server 104 that hosts the given publisher webpage can respond to the request by sending machine executable instructions that initiate presentation of the given webpage at the client device 106.

In another example, the electronic document servers 104 can include app servers from which client devices 106 can download apps. In this example, the client device 106 can download files required to install an app at the client device 106, and then execute the downloaded app locally. Alternatively, or additionally, the client device 106 can initiate a request to execute the app, which is transmitted to a cloud server. In response to receiving the request, the cloud server can execute the application and stream a user interface of the application to the client device 106 so that the client device 106 does not have to execute the app itself. Rather, the client device 106 can present the user interface generated by the cloud server's execution of the app, and communicate any user interactions with the user interface back to the cloud server for processing.

Electronic documents can include a variety of content. For example, an electronic document 150 can include native content 152 that is within the electronic document 150 itself and/or does not change over time. Electronic documents can also include dynamic content that may change over time or on a per-request basis. For example, a publisher of a given electronic document (e.g., electronic document 150) can maintain a data source that is used to populate portions of the electronic document. In this example, the given electronic document can include a script, such as the script 154, that causes the client device 106 to request content (e.g., digital component) from the data source when the given electronic document is processed (e.g., rendered or executed) by a client device 106 (or a cloud server). The client device 106 (or cloud server) integrates the content (e.g., digital component) obtained from the data source into the given electronic document to create a composite electronic document including the content obtained from the data source.

In some situations, a given electronic document (e.g., electronic document 150) can include a digital component script (e.g., script 154) that references the service apparatus 110, or a particular service provided by the service apparatus 110. In these situations, the digital component script is executed by the client device 106 when the given electronic document is processed by the client device 106. Execution of the digital component script configures the client device 106 to generate a request for digital components 112 (referred to as a "component request"), which is transmitted over the network 102 to the service apparatus 110. For example, the digital component script can enable the client device 106 to generate a packetized data request including a header and payload data. The component request 112 can include event data specifying features such as a name (or network location) of a server from which the digital component is being requested, a name (or network location) of the requesting device (e.g., the client device 106), and/or information that the service apparatus 110 can use to select one or more digital components, or other content, provided in response to the request. The component request 112 is transmitted, by the client device 106, over the network 102 (e.g., a telecommunications network) to a server of the service apparatus 110.

The component request 112 can include event data specifying other event features, such as the electronic document being requested and characteristics of locations of the electronic document at which digital component can be presented. For example, event data specifying a reference (e.g., URL) to an electronic document (e.g., webpage) in which the digital component will be presented, available locations of the electronic documents that are available to present digital components, sizes of the available locations, and/or media types that are eligible for presentation in the locations can be provided to the service apparatus 110. Similarly, event data specifying keywords associated with the electronic document ("document keywords") or entities (e.g., people, places, or things) that are referenced by the electronic document can also be included in the component request 112 (e.g., as payload data) and provided to the service apparatus 110 to facilitate identification of digital components that are eligible for presentation with the electronic document. The event data can also include a search query that was submitted from the client device 106 to obtain a search results page.

Component requests 112 can also include event data related to other information, such as information that a user of the client device has provided, geographic information indicating a state or region from which the component request was submitted, or other information that provides context for the environment in which the digital component will be displayed (e.g., a time of day of the component request, a day of the week of the component request, a type of device at which the digital component will be displayed, such as a mobile device or tablet device). Component requests 112 can be transmitted, for example, over a packetized network, and the component requests 112 themselves can be formatted as packetized data having a header and payload data. The header can specify a destination of the packet and the payload data can include any of the information discussed above.

The service apparatus 110 chooses digital components (e.g., third-party content, such as video files, audio files, images, text, and combinations thereof, which can all take the form of advertising content or non-advertising content) that will be presented with the given electronic document (e.g., at a location specified by the script 154) in response to receiving the component request 112 and/or using information included in the component request 112.

In some implementations, a digital component is selected in less than a second to avoid errors that could be caused by delayed selection of the digital component. For example, delays in providing digital components in response to a component request 112 can result in page load errors at the client device 106 or cause portions of the electronic document to remain unpopulated even after other portions of the electronic document are presented at the client device 106. Also, as the delay in providing the digital component to the client device 106 increases, it is more likely that the electronic document will no longer be presented at the client device 106 when the digital component is delivered to the client device 106, thereby negatively impacting a user's experience with the electronic document. Further, delays in providing the digital component can result in a failed delivery of the digital component, for example, if the electronic document is no longer presented at the client device 106 when the digital component is provided.

In some implementations, the service apparatus 110 is implemented in a distributed computing system that includes, for example, a server and a set of multiple computing devices 114 that are interconnected and identify and distribute digital component in response to requests 112. The set of multiple computing devices 114 operate together to identify a set of digital components that are eligible to be presented in the electronic document from among a corpus of millions of available digital components ($DC_{1-x}$). The millions of available digital components can be indexed, for example, in a digital component database 116. Each digital component index entry can reference the corresponding digital component and/or include distribution parameters ($DP_1$-$DP_x$) that contribute to (e.g., trigger, condition, or limit) the distribution/transmission of the corresponding digital component. For example, the distribution parameters can contribute to (e.g., trigger) the transmission of a digital component by requiring that a component request include at least one criterion that matches (e.g., either exactly or with some pre-specified level of similarity) one of the distribution parameters of the digital component.

In some implementations, the distribution parameters for a particular digital component can include distribution keywords that must be matched (e.g., by electronic documents, document keywords, or terms specified in the component request 112) in order for the digital component to be eligible for presentation. Additionally, or alternatively, the distribution parameters can include embeddings that can use various different dimensions of data, such as website details and/or consumption details (e.g., page viewport, user scrolling speed, or other information about the consumption of data). The distribution parameters can also require that the component request 112 include information specifying a particular geographic region (e.g., country or state) and/or information specifying that the component request 112 originated at a particular type of client device (e.g., mobile device or tablet device) in order for the digital component to be eligible for presentation. The distribution parameters can also specify an eligibility value (e.g., ranking score, or some other specified value) that is used for evaluating the eligibility of the digital component for distribution/transmission (e.g., among other available digital components).

The identification of the eligible digital component can be segmented into multiple tasks 117a-117c that are then assigned among computing devices within the set of multiple computing devices 114. For example, different computing devices in the set 114 can each analyze a different portion of the digital component database 116 to identify various digital components having distribution parameters that match information included in the component request 112. In some implementations, each given computing device in the set 114 can analyze a different data dimension (or set of dimensions) and pass (e.g., transmit) results (Res 1-Res 3) 118a-118c of the analysis back to the service apparatus 110. For example, the results 118a-118c provided by each of the computing devices in the set 114 may identify a subset of digital components that are eligible for distribution in response to the component request and/or a subset of the digital component that have certain distribution parameters. The identification of the subset of digital components can include, for example, comparing the event data to the distribution parameters, and identifying the subset of digital components having distribution parameters that match at least some features of the event data.

The service apparatus 110 aggregates the results 118a-118c received from the set of multiple computing devices 114 and uses information associated with the aggregated results to select one or more digital components that will be provided in response to the request 112. For example, the service apparatus 110 can select a set of winning digital components (one or more digital components) based on the outcome of one or more content evaluation processes, as discussed below. In turn, the service apparatus 110 can generate and transmit, over the network 102, reply data 120 (e.g., digital data representing a reply) that enable the client device 106 to integrate the set of winning digital components into the given electronic document, such that the set of winning digital components (e.g., winning third-party content) and the content of the electronic document are presented together at a display of the client device 106.

In some implementations, the client device 106 executes instructions included in the reply data 120, which configures and enables the client device 106 to obtain the set of winning digital components from one or more digital component servers 108. For example, the instructions in the reply data 120 can include a network location (e.g., a Uniform Resource Locator (URL)) and a script that causes the client device 106 to transmit a server request (SR) 121 to the digital component server 108 to obtain a given winning digital component from the digital component server 108. In response to the request, the digital component server 108 will identify the given winning digital component specified in the server request 121 (e.g., within a database storing multiple digital components) and transmit, to the client device 106, digital component data (DC Data) 122 that presents the given winning digital component in the electronic document at the client device 106.

When the client device 106 receives the digital component data 122, the client device will render the digital component (e.g., third-party content), and present the digital component at a location specified by, or assigned to, the script 154. For example, the script 154 can create a walled garden environment, such as a frame, that is presented within, e.g., beside, the native content 152 of the electronic document 150. In some implementations, the digital component is overlayed over (or adjacent to) a portion of the native content 152 of the electronic document 150, and the service apparatus 110 can specify the presentation location within the electronic document 150 in the reply 120. For example, when the native content 152 includes video content, the service apparatus 110 can specify a location or object within the scene depicted in the video content over which the digital component is to be presented.

As mentioned above, an entity that created and/or provided the digital component is generally restricted from accessing or modifying the native content 152 or other information about the electronic document 150, at least in certain ways, to prevent fraudulent or malicious activity by entities other than the publisher of the electronic document 150. Moreover, because the digital component is provided by an entity other than the publisher of the electronic document 150, the visual appearance of the digital component is generally not formatted or visually adjusted to blend with the native content 152 of the electronic document 150. As such, the presentation of the native content 152 and the digital component together within the electronic document 150 can result in an unappealing, inconsistent, and/or disjointed visual appearance. In other words, the presentation of the digital component with the native content can be distracting or disruptive to the user, thereby resulting in a less effective content presentation. This is particularly true in situations where the native content 152 is video content because overlaying video content with a digital component that looks very different from the object over which the digital component is presented is very distracting to a user viewing the video.

One way to improve the aesthetic appearance of the joint presentation of the native content 152 and the digital component (e.g., third-party content) within the electronic document 150 is to modify the visual appearance of the digital component based on visual characteristics of the native content 152 to provide a more blended look. However, this can be technically challenging when the digital component originates from a different domain (e.g., a different second level domain or domain server) than the electronic document 150. For example, given the potential of restricted access discussed above, as well as the time constraints within which the digital component must be provided and/or rendered for presentation within the electronic document 150, it can be difficult to determine how the digital component should be modified to create a consistent (e.g., blended) visual appearance with the native content 152 Furthermore, the visual appearance of the electronic document 150 may be more complicated than a simple background color, or well-known stock background pattern, and the native content 152 of the electronic document 152 may change over time, such that it is not possible to adequately describe the visual appearance of the electronic document in advance of the time at which the request 112 for the digital component is submitted by the client device 106. Furthermore, when the electronic document includes video content over which the digital component will be presented, the placement of the digital component, as well as it's visual characteristics, can occlude or otherwise distract from the video content.

As described in more detail below, the service apparatus 110 is configured to perform a multi-phase content blending technique that enables the visual appearance of a digital component to be modified in a way that blends the visual appearance of the digital component with the visual appearance of the native content with which the digital component will be presented. This multi-phase content blending technique includes a first phase that is performed "offline" (e.g., prior to receipt of the request 112 being submitted by the client device 106 and/or received by the service apparatus 110), which is referred to as an offline phase. The multi-phase content blending technique also includes a second phase that is performed online (e.g., between receipt of the request 112 and transmission of the reply 120), which is referred to as an online phase. Because the digital component is generally being served from a different domain (e.g., second level domain or domain server) than the electronic document, the multi-phase content blending technique is also referred to as a cross-domain blending technique.

Figure 2:
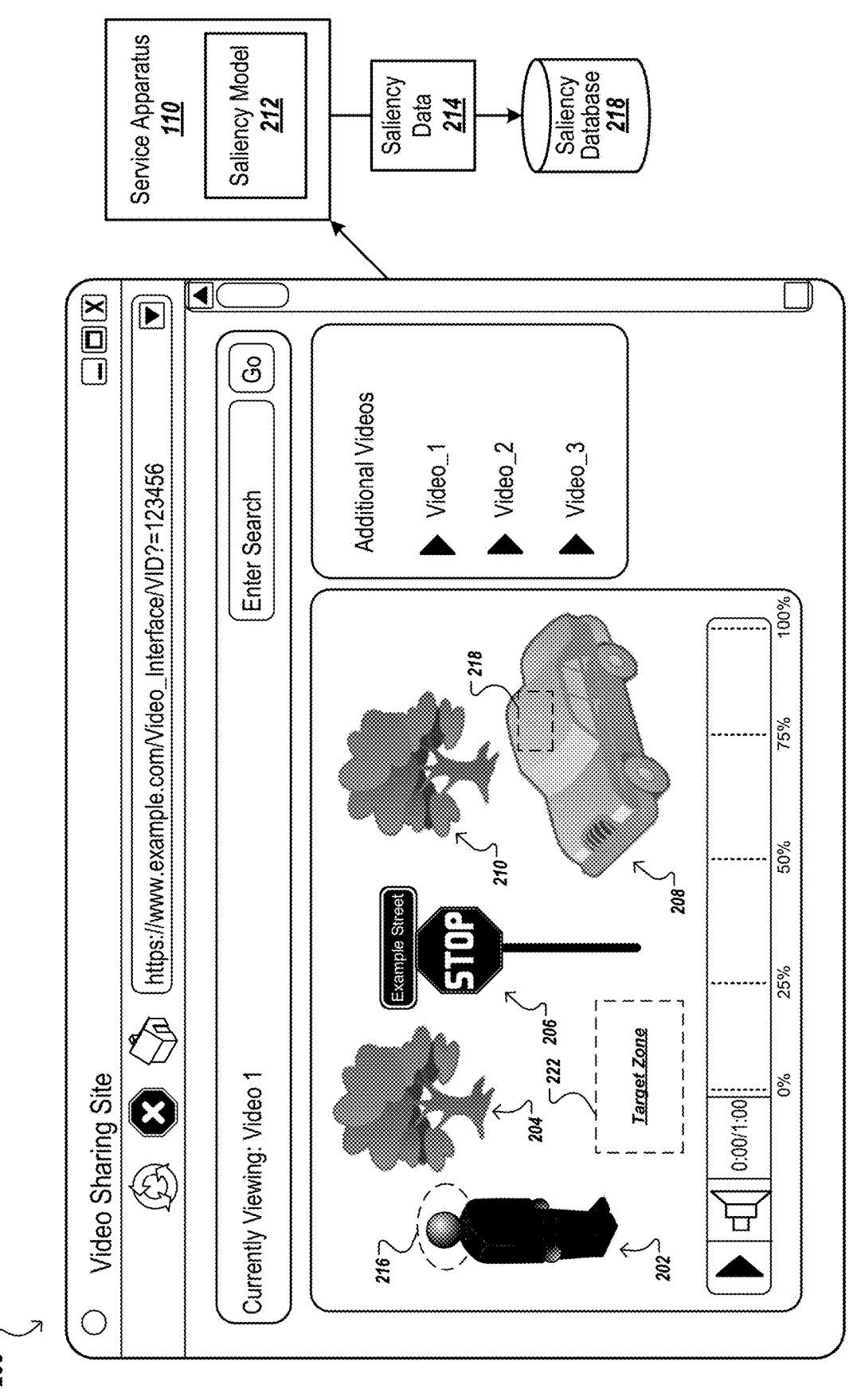
FIG. 2 is an illustration of an electronic document

FIG. 2 is an illustration of an electronic document 200 for which the cross-domain content blending technique can be used to blend the visual appearance of a digital component with the native content of the electronic document 200. In this example, the native content of the electronic document 200 is video content, and in the frame of the video content presented, the native content depicts a person 202, a tree 204, a stop sign 206, a car 208, and another tree 210. Note that the electronic document 200 could be an image or textual content rather than a video.

The offline phase of the cross-domain blending technique creates a set of multiple different digital component modifications that are available to be applied to a digital component during the online phase. For example, during the offline phase, the service apparatus 110 can use a saliency model 212 to identify different locations within the electronic document 200 at which presentation of the digital component should not occur and/or other locations at which presentation of the digital component could (e.g., is allowed to) occur. The locations at which digital components should not occur can be referred to as exclusion zones, while the locations at which digital component are allowed can be referred to as target zones.

The saliency model 212 can be implemented as a machine learning model that is trained to identify areas of saliency in an image (or video). For example, the training process can use a set of training images that are labeled to identify areas of saliency within the images. Based on this set of training images and labels, the saliency model can be trained to predict areas of an image that are salient (e.g., important to the viewing experience), and therefore not a good candidate location for presentation of a digital component because covering a salient location of an image (or video) will disrupt the viewing experience of the user. Some features of images that are commonly associated with salient areas of an image (or video) include areas of the image (or video) that include at least a specified occurrence of edges, a face, or another object that is deemed to be important to the viewing experience.

The saliency model 212 will analyze the electronic document 200, and output a set of saliency data 214. The set of saliency data 214 can define areas of the electronic document that should be excluded from presenting a digital component. For example, assume that the saliency model 212 identifies the person 202, and more specifically an area of the electronic document 200 occupied by the face of the person 202. In this example, the saliency model 212 can identify the area surrounding the persons face as an exclusion zone where no digital components can be presented, as visually represented by the dashed ellipse 216. Similarly, the saliency model may identify the locations surrounding the leaves of the tree as exclusion zones based on the higher level of detail (e.g., high number of edges) presented at these areas of the electronic document. The set of exclusion zones identified by the saliency model 212 and/or the service apparatus can be specified in the saliency data 214 and stored in a saliency database that stores saliency information for multiple different electronic documents.

In some implementations, the set of saliency data 214 can also include target zones that are target locations at which digital components are able to be presented within the electronic document 200. The target zones can be defined, for example, to includes those areas of the electronic document that have less than a specified level of saliency, as determined by the saliency model 212. In some situations, the target zones can be all areas of the electronic document that are outside of the exclusion zones discussed above. In other situations, the target zones can be identified independent of any exclusion zones. For example, the target zones could be identified based on their low level of saliency without having to also identify exclusion zones. In some implementations, the target zones are required to not occlude portions of the electronic document 200 that have been identified as salient areas/exclusion zones.

Irrespective of the manner in which the target zones are identified, the set of saliency data 214 can include information specifying the target zones for the electronic document 200 and/or information from which the target zones can be derived (e.g., exclusion zones). For purposes of example, assume that the dashed rectangle 220 on the roof of the car 208 has been identified as a target zone for presentation of a digital component. In this example, the location and/or area occupied by the rectangle 220 can be stored in the saliency database 218 as a target zone for the electronic document. Continuing with this example, also assume that the area enclosed by the dashed rectangle 222 was also identified as a target zone. The information about the target zone for the electronic document can be used in combination with other information to enable modification of digital components that cause the digital components to visually blend into the electronic document 200 when presented together.

For each target zone (e.g., 218 and 222) or other available area, the service apparatus 110 can generate multiple different sets of modifications that can be applied to the digital component based on the visual characteristics of the native content presented around that location. Each set of modifications can include one or more of a modification to a background color, texture, edge sharpness, text font, text size, text color, or shape of the digital component. The different sets of modification for each target zone can include a different combination of modifications so that the digital component can have a different visual appearance depending on the set of modifications applied to the digital component at the time the digital component is selected for presentation with the electronic document. This enables the digital component to not only be modified to visually blend into the electronic document, but also personalize the visual appearance of the digital component based on the audience to whom the digital component is being presented.

In some implementations, each set of modifications is required to not result in the digital component occluding any (or a specified subset of) salient areas of the electronic document. For example, a constraint can specify that a size of the text cannot be increased to a size that would overlap the face of the person 202 (e.g., within the dashed ellipse 216).

To ensure that a given set of modifications will not result in occlusion of salient areas of the electronic document 200 by the digital component (as modified), the service apparatus 110 can perform a visual analysis of the presentation of the digital component, as modified by the given set of modifications, to determine whether there is overlap between the modified digital component and any of the salient areas of the electronic document. For example, the service apparatus 110 can identify the salient areas in the electronic document 200 prior to insertion of the digital component (as modified), and then determine whether any of those salient areas are overlapped or otherwise occluded by the insertion of the digital component. When the service apparatus 110 determines that a given set of modifications will cause the digital component to overlap, or otherwise occlude, a salient area of the electronic document, that given set of modifications can be excluded from the approved set of modifications that are available to apply to the digital component.

The service apparatus 110 can also examine the content of the electronic document to determine the visual characteristics of the electronic document 200 to assist in blending the visual characteristics of the digital component with the visual characteristics of the electronic document 200. For example, the service apparatus 110 can use computer vision techniques to determine color attributes, texture attributes, pattern attributes, and other visual characteristics of the electronic document 200. In some implementations, the determination of the visual characteristics can be limited to the portions of the electronic document 200 that have not been identified as salient areas or exclusion zones since the digital component will not be overlapping these areas. Limiting the portion of the electronic document examined will reduce the amount of processing resources required to perform the blending, which results in a significant reduction of processing resources in situations where millions of electronic documents need to be examined. The processing resource reduction is even greater where the examination of the electronic documents is done periodically (e.g., every hour, day, or week) to ensure that the visual characteristic information is current when the digital component is requested. For example, electronic documents can change over time (e.g., seasonally) to visually present different themes (e.g., holiday themes, seasonal themes, or themes consistent with the text or other content being presented at that time). As such, examining the electronic document periodically will increase the likelihood that the modifications being made to the digital component actually blend with the content of the electronic document.

In some implementations, the set of the service apparatus 110 can select various combinations of colors, patterns, textures, fonts, etc. for the digital component, and evaluate how well those combinations blend with the electronic document. For example, the service apparatus 110 can create a blending score (e.g., 0-10 or 0-100) that represents how well the modifications blend the digital component with the electronic document, with a higher blending score representing a higher quality blending.

As part of the evaluation process, the service apparatus 110 can overlay the modified digital component at locations of the electronic document 200 that do not depict salient objects, and compute the level of visual contrast between the pixels of the overlaid portion of the digital component and pixels of the electronic document that are adjacent to the pixels of the digital component. For textual content, the service apparatus 110 may require at least a minimum level of contrast to ensure that the text is legible to the viewer (e.g., distinguishable from the content of the electronic document). For image content, the service apparatus 110 may require less than a specified level of contrast to ensure that the image blends well with the surrounding content of the electronic document. In some implementations, the blending score can be increased for higher levels of contrast between the text content and surrounding content and/or lower levels of contrast between image content and the surrounding content.

Once the digital component is overlaid on the electronic document, the service apparatus 110 can iteratively modify text sizes, fonts, colors, textures, etc. and evaluate how well the different modifications blend with the electronic document 200. Furthermore, the service apparatus 110 can modify the size and shape of the digital component to determine which sizes and shapes can be used without overlapping, or otherwise occluding, the salient areas of the electronic document 200. When the service apparatus 110 determines a combination of modifications that are deemed to blend well with the electronic document 200, and do not overlap, or otherwise occlude, the salient areas of the electronic document 200, the service apparatus 110 can store that combination of modifications as one of the approved sets of modifications for the digital component when selected for presentation on the electronic document. As discussed in more detail below, the service apparatus 110 can select which of the sets of modifications will be used at the time of the request based, at least in part, on various contextual signals received at that time.

In some implementations, the approved sets of modifications for the digital component—electronic document pair can include only those sets of modifications that have at least a specified blending score, indicating an aesthetically pleasing level of blending between the electronic document 200 and the digital component as modified. In some implementations, the service apparatus 110 can store the top N sets of modifications for each digital component—electronic document pair. For example, the service apparatus 110 can identify the N sets of modifications having the highest blending score, or another metric of aesthetically pleasing blending, and store those sets of modifications as the approved sets of modifications for the digital component—electronic document pair.

Once the approved sets of modifications have been identified for the digital component—electronic document pair, the approved sets of modifications can be used as templates for modifying the digital component in response to a request for a digital component to present on the electronic document. For example, when the service apparatus 110 receives a request for a digital component from a client device presenting the electronic document 200, the request can include a document identifier (e.g., URL, file name, or another identifier) that identifies the electronic document 200. In this example, the service apparatus 110 can use the document identifier to search the saliency database 218, which can store the sets of approved modifications for digital components being presented with the electronic document 200. Specifically, the sets of approved modifications may be indexed to the document identifier, such that the search using the document identifier can surface the sets of approved modifications for digital components being presented with the electronic document 200. Once identified, the service apparatus 110 can apply one of the sets of approved modifications to a digital component that is going to be provided in response to the request for the digital component.

In some situations, the service apparatus 110 may identify the digital component that is going to be provided in response to the request prior to searching the saliency database 218. In these situations, the search may use a combination of the document identifier and a digital component identifier to identify the approved sets of modifications that are indexed to both of the document identifier and the digital component identifier. In this way, the search can be over a smaller subset of the saliency database 218. In other situations, the service apparatus 110 may perform the search and the digital component selection in parallel so that the approved sets of modifications are identified while the digital component is selected. This has the potential to reduce the latency associated with modifying the digital component at the time of the request (e.g., by not waiting until the selection of the digital component is complete prior to searching for the approved sets of modifications).

In some implementations, the search for the approved sets of modifications can also use contextual information received in the request for the digital component (or otherwise available to the service apparatus 110). For example, the request can include information specifying a device type that is presenting the electronic document 200, a country from which the request was received, or information corresponding to interests and/or preferences of the user to whom the digital component will be presented. Using this information, the service apparatus 110 can personalize the visual appearance of the digital component on a per-request/per-presentation basis, while also ensuring that the personalization maintains a sufficient level of visual blending with the content of the electronic document.

More specifically, the service apparatus 110 can select one of the approved sets of modifications that is determined to be preferred by the user based on the contextual information obtained by the service apparatus 110 at the time the request is received. For example, each approved set of modifications may have metadata specifying the context in which that set of modifications is eligible for presentation. In this example, the service apparatus 110 can use the contextual information obtained at the time of the request, and attempt to match that contextual information to the metadata of one of the approved sets of modifications. In some implementations, the approved set of modifications having the highest level of match to the contextual information obtained by the service apparatus 110 will be used to modify/format the digital component for presentation with the electronic document 200.

In some implementations, the contextual information obtained by the service apparatus 110 can also include one or more characteristics indicative of a current state of the electronic document. For example, the contextual information obtained by the service apparatus 110 can include information about a most recent evaluation of the electronic document to determine certain visual characteristics of the current version of the electronic document. In this way, the service apparatus 110 can ensure that the set of modifications selected will result in the intended blending effect given the current state of the electronic document. In some implementations, the visual characteristics of the current version of the electronic document can be used to make additional, or different modifications, than the selected set of modifications, without requiring all of the modifications to be determined and/or changed. This can provide for further flexibility in the modification of the digital component to achieve a better blending between the digital component and the electronic document 200 while still obtaining benefits (e.g., lower latency) of pre-computing the d Once the service apparatus 110 has selected the set of modifications, the service apparatus 110 visually modifies the digital component. In some implementations, the service apparatus 110 visually modifies the digital component by applying formatting to the digital component in accordance with the set of modifications that was selected. In some implementations, the service apparatus 110 visually modifies the digital component by sending formatting instructions consistent with the selected set of modifications to the client device that is presenting the electronic document. In either situation, the visual modification of the digital component will include one or more of a modification to textual content or image content of the digital component. For example, the visual modifications can include changing a font type, font size, or font color of the textual content. The visual modifications can also include changing a color, texture, shape, or other visual characteristics of image content of the digital component.

The service apparatus 110 serves the modified digital component to the client device that submitted the request for the digital component. In some implementations, the modified digital component has already had the set of modifications applied prior to being served. In some implementations, the service apparatus 110 sends formatting instructions with the digital component. For example, the service apparatus 110 can select the digital component for serving in response to the request, and transmit the digital component with instructions that, when executed by the client device, cause the formatting to be applied to the digital component as specified by the selected set of modifications. For purposes of this document, this is still considered serving the modified digital component because the combination of information provided in response to the request results in the presentation of the digital component, as modified by the selected set of modifications. Similarly, when the service apparatus 110 sends the client device a network location where the digital component can be retrieved along with instructions specifying how to modify/present the digital component, this is considered serving the digital component as visually modified according to the selected set of modifications.

In some implementations, the digital component may be a video digital component that includes motion images (e.g., a series of image frames). In these implementations, the video digital component can be modified by way of the playback start point for the video digital component. For example, when the digital component is a video, the context of the electronic document (e.g., the native content) can be determined, and used to determine the point in the video where playback will begin. More specifically, the context of the electronic document can be used to determine a location within the video digital component that corresponds to (e.g., matches) the context of the electronic document. To illustrate, assume that the electronic document is presenting a race scene. In this example, the content of the video digital component can be evaluated to determine a location within the playback duration of the video digital component that is most relevant to the race scene (e.g., depicts a driving car), and designate that location of the video as the start point for playback of the video digital component. In turn, the video digital component can be served, and playback of the video digital component can begin at the designated location rather than the beginning of the video digital component based on the determined relevance of that location of the video digital component to the context of the electronic document.

FIG. 3 is a flow chart of an example process 300 for visually blending content from different domains. Operations of the process 300 can be performed, for example, by the service apparatus 110 of FIG. 1, or another data processing apparatus. The operations of the process 300 can also be implemented as instructions stored on a computer readable medium, which can be non-transitory. Execution of the instructions, by one or more data processing apparatus, causes the one or more data processing apparatus to perform operations of the process 300.

A set of text and a set of images are obtained (302). In some implementations, the set of text and the set of images are provided by a given content provider. For example, the set of text and the set of images can be provided by a given content provider (or another entity) that is requesting one or more combinations of the text and images to be combined to create a digital component, and distributed for presentation with content (e.g., an electronic document) provided by another entity (e.g., a publisher of a video, web page, application, or another electronic document). For example, the set of text and the set of images can be uploaded to the service apparatus 110 of FIG. 1 by the given content provider, and designated as portions of content that can be combined to create a digital component. In some situations, the set of text and the set of images are uploaded separately, such that different portions of the text can be combined with different portions of the images to create multiple different digital components. The source of the set of text and the set of images can be a given second level domain or domain server.

A saliency model is applied to an electronic document (304). In some implementations, the saliency model is configured, using at least one machine learning training technique, to accept image data as input and output locations of salient areas in the image. For example, as discussed above, the saliency model can be trained using images that have salient objects or areas and/or non-salient objects or areas labeled, which enables the saliency model to generate labels for different portions of input images. That is, when unlabeled image data is input to the saliency model, the saliency model can output labels and locations of the image corresponding to those labels. The labels can be "salient" or "non-salient", and provide locations within the image that are designated salient of non-salient. In some situations, the saliency model can output a saliency score for different portions of the image rather than assigning labels to the different portions of the image. In these situations, the saliency scores can be used to rank the saliency of different portions of the input image. Note that the use of the term image in this context can include video content or still images. In some implementations, the saliency model can be, or include, one or more of an object detector, a person/face detector, or another model that is capable of identifying a salient object.

Application of the saliency model to the electronic document can include, for example, inputting the electronic document to the saliency model, and generating an output using the saliency model. For example, with reference to FIG. 2, application of the saliency model to the electronic document can be performed by inputting the scene depicted into the saliency model, and generating the saliency data 214.

In the context of video content, application of the saliency model to the video content can include generating the saliency data 214 for multiple different frames of the video content. In those situations, the saliency model can output saliency data for each frame, and the saliency of different areas of the frames can be evaluated over time. For example, for a 10-second clip of a video, each frame of the video can be input to the saliency model to obtain a corresponding set of saliency data. To determine the salient areas of the video for that 10-second clip, the saliency data for each frame can be aggregated, and only those areas that are not deemed salient for any of the frames (or less than a threshold portion of the frames) will be deemed non-salient for the 10-second clip. In other words, for a given location within the 10-second clip, if that given location is deemed salient in any (or a threshold portion of) the frames, the location can be labeled as salient for the 10-second clip. Alternatively, or additionally, a temporal window can be located in a non-salient area, and text or other content can be added to that non-salient area during the temporal window.

Sets of modifications to the set of text and the set of images are constructed (306). In some implementations, the sets of modifications constructed do not result in the salient areas of the electronic document being overlapped by the set of text and/or the set of images. As discussed above with reference to FIG. 2, modifications to the text can include modifying a typography of the set of text, such as modifications to the font type, font size, font color, font spacing, or other visual aspects of the text, and modifications to images can include changes to colors of the image, textures, fill content, or other visual aspects of the images.

Approved sets of the modifications are identified (308). In some implementations, the process of approving a given set/combination of modifications can be initiated by rendering a modified/revised digital component over a target location of the electronic document. The modified digital component can be constructed using the set of images and the set of text with the modified typography and/or modified visual aspects of the set of images, as defined by the given set of modifications, and presented at a location of the electronic document that has been deemed non-salient, or at least has not been deemed salient.

Once the modified digital component is overlaid on the electronic document, one or more one or more computer vision processes are performed on the presentation of the modified digital component overlaid on the electronic document to determine whether any portion of the modified digital component overlaps the salient areas of the electronic document. Then the given set of modifications is classified based on whether the salient areas of the image are overlapped. When it is determined (e.g., by the service apparatus) that one or more salient areas (or a threshold amount of salient areas) are overlapped by the modified digital component, the given set of modifications is classified as disapproved. When it is determined (e.g., by the service apparatus) that no salient areas (or less than a threshold amount of salient areas) are overlapped by the modified digital component, the given set of modifications is classified as approved. As discussed above, approved sets of modifications can be stored in a database and indexed to the electronic document, the digital component, or both so that the approved sets of modifications can be identified through a search of the database.

In some implementations, the digital component can be initially overlaid on the electronic document with one set of visual characteristics, and then iteratively changed to iteratively evaluate different sets/combinations of modifications. For example, once the digital component is overlaid on the electronic document, the typography of the text can be iterative changed, and the set of visual characteristics of the digital component at that time can be considered a set of modifications that can be evaluated as discussed above.

Modifications to the digital component can include modifying a shape of an image to a target shape. For example, the shape of the digital component can be adjusted to differ from an original shape of the digital component (e.g., an image being used in the digital component) and/or a shape of a target zone in the electronic document. For example, assume that the digital component is formed using a rectangular image and/or that the target zone is available for presentation in the electronic document is rectangular. In either of these situations, the digital component can be modified to have a modified shape while still providing a blended appearance with the native content of the electronic document.

For example, dimensions of the target zone at which the digital component is rendered can be determined, and a shape template, such as a star template, can be applied to the digital component to create a customized digital component having a star shape instead of its original rectangular shape. Assuming, for purposes of this example, that the target zone of the electronic document is also rectangular in shape, the dimensions of that target zone can be determined, and the star shaped digital component can be sized to fit within the rectangular target zone.

Sizing the star shaped digital component to fit within the rectangular target zone will result in less than all of the rectangular target zone being occupied by the star shaped digital component. In these situations, the blending of the digital component and the native content of the electronic document can include selecting fill content to occupy the areas of the target zone that are not occupied by the star shaped digital component based on the visual characteristics of the native content of the electronic document that is adjacent to the target zone. For example, based on the result of computer vision processes performed on the presentation of the star shaped digital component over the electronic document, fill content that provides a smooth transition, or blending, of the star shaped digital component and the native content of the electronic document can be selected. This fill content can be selected, for example, to provide gradual color transitions (e.g., fading) from a color of the star shaped digital component and a different color of the native content near the presentation location of the star shaped digital component. Additionally, or alternatively, a deep learning model, such as a diffusion model cam be used to fill the gap. Similarly, fill content can be selected to provide gradual transitions between different patterns or textures. In some implementations, the fill content can be inserted into the areas of the target zone that are not occupied by the digital component. This example refers to a star shaped digital component, but similar techniques can be applied to digital components of any shape or size. For example, if the size of a rectangular digital component is smaller than the size of the target zone in the electronic document, fill can be inserted to occupy the rest of the target zone that is not occupied by the digital component.

Visual characteristics of the electronic document are determined (310). In some implementations, the visual characteristics of the electronic document can be determined by performing one or more computer vision operations on the electronic document. For example, the computer vision operations can include object recognition that identifies objects depicted by the electronic document, color analysis, texture analysis, pattern detection, or other types of computer vision operations that provide information about the visual presentation of the electronic document. In some implementations, the visual characteristics of the electronic documents can include crawling the electronic document to identify a structure and/or characteristics that are specified in the structure of the electronic document. For example, an html structure of a web page can be examined to determine color information in different portions of the web page, textures or patterns that occupy different portions of the web page, fonts used, and other formatting settings for the web page.

As discussed above, the visual characteristics of the electronic document can be periodically determined and stored so that the current state of the electronic document is known when a request is received. Periodically determining the visual characteristics of the electronic document can be important because electronic documents often change appearance over time, such that the approved set of modifications that should be used to format the digital component may also change over time.

A request for content to integrate into the electronic document is received from a client device (312). In some implementations, the request is received based on the client device executing a script that generates the request. For example, in a web page or an application, an embedded script can be executed when the web page is rendered, or the application reaches a specified state. In the context of a video electronic document, the request can be generated when playback of the video reaches a specified point.

The request can include information identifying the electronic document and potentially contextual information. The information identifying the electronic document and the contextual information can help facilitate the selection of the set of modifications that will be applied to a digital component as discussed above with reference to FIG. 2. The contextual information can also provide information that can be used to select additional modifications that may not be defined in any of the approved sets of modifications. For example, assume that the request includes contextual information indicating that the request originated from a client device in Virginia. In this example, the contextual information can be used to identify content (e.g., text or image) that is relevant to an event occurring in Virginia at the time of the request even if this content is not specified in any of the approved sets of modification. This provides more customization for the digital component based on real time data relative to relying solely on the offline process discussed above.

The digital component is visually modified (314). In some implementations, the digital component is visually modified based on a combination of the constructed set of modifications and the determined visual characteristics of the electronic document. For example, using the determined visual characteristics of the electronic document (e.g., the current state of the electronic document), the set of modifications that will be used to visually modify the digital component can be selected. In a specific example, color information (or other visual characteristics) of the native content of the electronic document can be used to filter the approved sets of modifications that are eligible to be applied to the digital component.

Similarly, topics relevant to the native content of the electronic document can be used to filter the approved sets of modifications that are eligible to be applied to the digital component. For example, if a sad topic is currently being presented by the electronic document, sets of modifications that use vibrant colors may be excluded from eligibility so that sets of modifications available for selection will be those that use darker colors. In contrast, if a funny topic is currently being presented by the electronic document, those sets of modifications that use vibrant colors may be eligible for use to modify the digital component.

Once a given set of modifications is selected (e.g., based on information included in the request), the given set of modifications is applied to the digital component to create the visually modified digital component. As discussed above, the application of the given set of modifications can be performed by the apparatus that selects the given set of modifications, or the client device. In either case, creating a set of data that causes/results in the modified presentation of the digital component at the client device is considered to be a visual modification of the digital component.

In some situations, visually modifying at least one of the set of text or the set of images based a combination of (i) the constructed set of modifications and (ii) the determined visual characteristics of the electronic document can include modifying the set of text to match a target typography of the electronic document based on the target typography being classified as acceptable. For example, the target typography can be deed acceptable because the salient areas of the images in the electronic document are not overlapped when the digital component is modified to use the target typography.

Visually modifying at least one of the set of text or the set of images based a combination of (i) the constructed set of modifications and (ii) the determined visual characteristics of the electronic document can also include modifying the shape of an image of the digital component to a target shape based on the set of computer vision processes indicating that the target shape of the image results in a pre-specified change in distance between the image and the native content of the electronic document. For example, in some situations, content restrictions can be associated with an electronic document, and these content restrictions can specify that there must be at least a specified number of pixels (or distance) between the edge of a digital component that is overlaid on the electronic document and certain areas of native content in the electronic document. In this example, the shape of the digital component may be adjusted so that all of the edges of the digital component comply with the content restrictions.

Visually modifying at least one of the set of text or the set of images of the digital component based a combination of (i) the constructed set of modifications and (ii) the determined visual characteristics of the electronic document can include modifying the shape of the image to the target shape based on one or more characteristics of an intended audience for the digital component. For example, when the digital component is going to be presented to an audience watching a video suitable for young children (e.g., having a TV rating that is acceptable for all audiences), the digital component may be modified to take on the shape of a star or balloon. Meanwhile, when the digital component is going to be presented to an audience watching a video that is for mature audiences (e.g., having a TV rating of TVMA), the digital component may be modified to have a more traditional shape, such as a square or a rectangle.

As discussed above, the request can include contextual information that can also be used to select the set of modifications that is used to modify the set of text and/or the set of images of the digital component. For example, assume that the request for content is submitted by a client device that is determined to be in Virginia. In this example, the digital component could be modified to incorporate content (e.g., text or an image) that is relevant to an event that is occurring in Virginia, so that the digital component may be more interesting to a person in Virginia even though this modification is not specified in any of the sets of approved modifications. In this way, the digital component can be modified using the selected set of modifications that were pre-computed for the digital component (e.g., performed offline), and also modified using additional contextual information obtained, or available, at the time of the request for content. This enables more complex modifications to the digital component to be carried out at the time of the request, while still ensuring temporally relevant modifications to the digital component, than would be possible if all of the modifications had to be determined at the time of the request, particularly given the stringent time constraints within which the digital component is required to be served following the request.

The modified digital component is served (316). In some implementations, the modified digital component is served by transmitting the modified digital component over a communications network (e.g., optical, or wireless communications network) to the client device that submitted the request. The modified digital component is visually modified according to the selected set of modifications that were pre-computed during the offline process, and potentially using the contextual information obtained, or available, at the time of the request for content.

Figure 4:
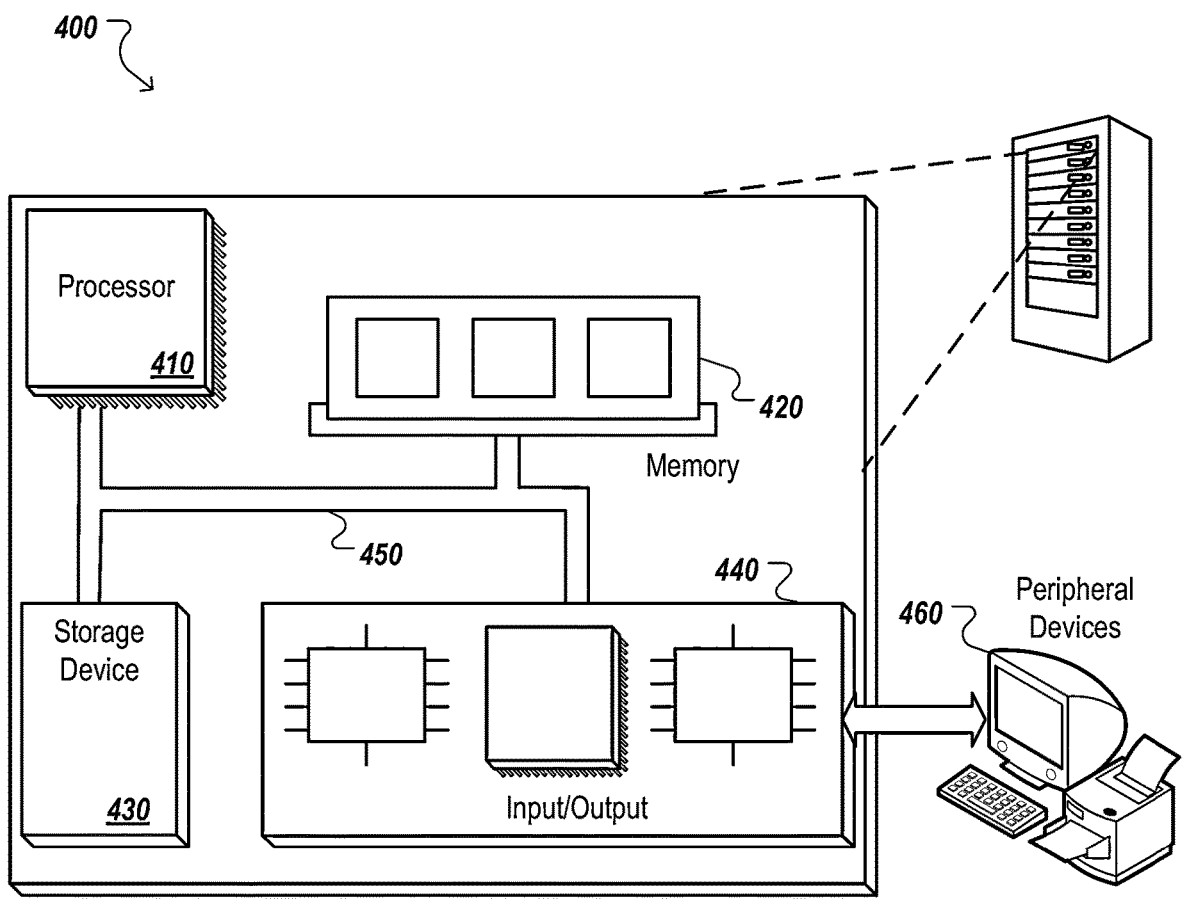
FIG. 4 a block diagram of an example computer.

FIG. 4 is a block diagram of an example computer system 400 that can be used to perform operations described above. The system 400 includes a processor 410, a memory 420, a storage device 430, and an input/output device 440. Each of the components 410, 420, 430, and 440 can be interconnected, for example, using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430.

The memory 420 stores information within the system 400. In one implementation, the memory 420 is a computer-readable medium. In one implementation, the memory 420 is a volatile memory unit. In another implementation, the memory 420 is a non-volatile memory unit.

The storage device 430 is capable of providing mass storage for the system 400. In one implementation, the storage device 430 is a computer-readable medium. In various different implementations, the storage device 430 can include, for example, a hard disk device, an optical disk device, a storage device that is shared over a network by multiple computing devices (e.g., a cloud storage device), or some other large capacity storage device.

The input/output device 440 provides input/output operations for the system 400. In one implementation, the input/output device 440 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other devices, e.g., keyboard, printer, display, and other peripheral devices 460. Other implementations, however, can also be used, such as mobile computing devices, mobile communication devices, set-top box television client devices, etc.

Although an example processing system has been described in FIG. 4, implementations of the subject matter and the functional operations described in this specification can be implemented in other types of digital electronic circuitry, or in computer software, firmware, or hardware, including the structures disclosed in this specification and their structural equivalents, or in combinations of one or more of them.

An electronic document (which for brevity will simply be referred to as a document) does not necessarily correspond to a file. A document may be stored in a portion of a file that holds other documents, in a single file dedicated to the document in question, or in multiple coordinated files.

For situations in which the systems discussed here collect and/or use personal information about users, the users may be provided with an opportunity to enable/disable or control programs or features that may collect and/or use personal information (e.g., information about a user's social network, social actions or activities, a user's preferences, or a user's current location). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

This document refers to a service apparatus. As used herein, a service apparatus is one or more data processing apparatus that perform operations to facilitate the distribution of content over a network. The service apparatus is depicted as a single block in block diagrams. However, while the service apparatus could be a single device or single set of devices, this disclosure contemplates that the service apparatus could also be a group of devices, or even multiple different systems that communicate in order to provide various content to client devices. For example, the service apparatus could encompass one or more of a search system, a video streaming service, an audio streaming service, an email service, a navigation service, an advertising service, a gaming service, or any other service.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A method, comprising:

obtaining, by one or more processors and from a given content provider, a set of text and a set of images that are designated for combination to create a digital component;

applying, by the one or more processors and to an electronic document, a saliency model configured, using at least one machine learning training technique, to accept image data of an image as input and output locations of salient areas in the image;

constructing, by the one or more processors, a set of modifications to the set of text or the set of images that do not result in the salient areas in the electronic document being overlapped by the set of text or the set of images;

determining, by the one or more data processing apparatus, visual characteristics of the electronic document;

after performing the obtaining, applying, constructing, and determining:

receiving, from a client device, a request for content to integrate into the electronic document that is provided to the client device by a different domain than the digital component;

visually modifying, by the one or more processors and after receiving the request for content, at least one of the set of text or the set of images based a combination of (i) the constructed set of modifications and (ii) the determined visual characteristics of the electronic document;

serving, by the one or more processors and in response to receiving the request for content, the digital component to the client device as visually modified by the one or more processors.

2. The method of claim 1, wherein constructing the set of modifications further comprises:

modifying a typography of the set of text according to a given set of modifications;

rendering a revised digital component that includes at least one image from among the set of images and at least some text from among the set of text with the modified typography;

performing one or more computer vision processes on a presentation of the revised digital component overlaid on the electronic document to determine whether the salient areas of the image are overlapped; and classifying the given set of modifications based on whether the salient areas of the image are overlapped.

3. The method of claim 2, wherein:

visually modifying at least one of the set of text or the set of images based a combination of (i) the constructed set of modifications and (ii) the determined visual characteristics of the electronic document comprises modifying the set of text to match a target typography of the electronic document based on the target typography being classified as acceptable based on the salient areas of the images not being overlapped when modified to the target typography; and serving the digital component to the client device as visually modified by the one or more processors comprises serving the digital component including the target typography of the electronic document.

4. The method of claim 3, wherein constructing the set of modifications further comprises:

modifying a shape of the image to a target shape;

rendering the revised digital component with the modified shape of the image;

performing a set of computer vision processes on the revised digital component; and classifying the revised digital component based on a result of the set of computer vision processes performed on the revised digital component.

5. The method of claim 4, wherein visually modifying at least one of the set of text or the set of images based a combination of (i) the constructed set of modifications and (ii) the determined visual characteristics of the electronic document comprises modifying the shape of the image to the target shape based on the set of computer vision processes indicating that the target shape of the image results in a pre-specified change in distance between the image and the content of the electronic document.

6. The method of claim 5, wherein visually modifying at least one of the set of text or the set of images based a combination of (i) the constructed set of modifications and (ii) the determined visual characteristics of the electronic document comprises modifying the shape of the image to the target shape based on one or more characteristics of an intended audience for the digital component.

7. The method of claim 5, wherein:

the digital component comprises video content, the method further comprising:

determining, based on the content of the electronic document, a context of the electronic document;

determining a location within the video content that corresponds to the context of the electronic document; and beginning playback of the video content at the location rather than a beginning of the video content based on the determination that the location within the video content corresponds to the context of the electronic document.

8. A non-transitory computer readable medium storing instructions that, upon execution by one or more data processing apparatus, cause the one or more data processing apparatus to perform operations comprising:

obtaining, from a given content provider, a set of text and a set of images that are designated for combination to create a digital component;

applying, to an electronic document, a saliency model configured, using at least one machine learning training technique, to accept image data of an image as input and output locations of salient areas in the image;

constructing a set of modifications to the set of text or the set of images that do not result in the salient areas in the electronic document being overlapped by the set of text or the set of images;

determining visual characteristics of the electronic document;

after performing the obtaining, applying, constructing, and determining:

receiving, from a client device, a request for content to integrate into the electronic document that is provided to the client device by a different domain than the digital component;

visually modifying, after receiving the request for content, at least one of the set of text or the set of images based a combination of (i) the constructed set of modifications and (ii) the determined visual characteristics of the electronic document;

serving, in response to receiving the request for content, the digital component to the client device as visually modified by the one or more processors.

9. The non-transitory computer readable medium of claim 8, wherein constructing the set of modifications further comprises:

modifying a typography of the set of text according to a given set of modifications;

rendering a revised digital component that includes at least one image from among the set of images and at least some text from among the set of text with the modified typography;

performing one or more computer vision processes on a presentation of the revised digital component overlaid on the electronic document to determine whether the salient areas of the image are overlapped; and classifying the given set of modifications based on whether the salient areas of the image are overlapped.

10. The non-transitory computer readable medium of claim 9, wherein:

visually modifying at least one of the set of text or the set of images based a combination of (i) the constructed set of modifications and (ii) the determined visual characteristics of the electronic document comprises modifying the set of text to match a target typography of the electronic document based on the target typography being classified as acceptable based on the salient areas of the images not being overlapped when modified to the target typography; and serving the digital component to the client device as visually modified by the one or more processors comprises serving the digital component including the target typography of the electronic document.

11. The non-transitory computer readable medium of claim 10, wherein constructing the set of modifications further comprises:

modifying a shape of the image to a target shape;

rendering the revised digital component with the modified shape of the image;

performing a set of computer vision processes on the revised digital component; and classifying the revised digital component based on a result of the set of computer vision processes performed on the revised digital component.

12. The non-transitory computer readable medium of claim 11, wherein visually modifying at least one of the set of text or the set of images based a combination of (i) the constructed set of modifications and (ii) the determined visual characteristics of the electronic document comprises modifying the shape of the image to the target shape based on the set of computer vision processes indicating that the target shape of the image results in a pre-specified change in distance between the image and the content of the electronic document.

13. The non-transitory computer readable medium of claim 12, wherein visually modifying at least one of the set of text or the set of images based a combination of (i) the constructed set of modifications and (ii) the determined visual characteristics of the electronic document comprises modifying the shape of the image to the target shape based on one or more characteristics of an intended audience for the digital component.

14. The non-transitory computer readable medium of claim 12, wherein:

the digital component comprises video content; and the instructions cause the one or more data processing apparatus to perform operations further comprising:

determining, based on the content of the electronic document, a context of the electronic document;

determining a location within the video content that corresponds to the context of the electronic document; and beginning playback of the video content at the location rather than a beginning of the video content based on the determination that the location within the video content corresponds to the context of the electronic document.

15. A system, comprising:

one or more memory devices; and a service apparatus, including one or more data processing apparatus, configured to access the one or more memory devices and execute instructions that cause the one or more data processing apparatus to perform operations comprising:

obtaining, from a given content provider, a set of text and a set of images that are designated for combination to create a digital component;

applying, to an electronic document, a saliency model configured, using at least one machine learning training technique, to accept image data of an image as input and output locations of salient areas in the image;

constructing a set of modifications to the set of text or the set of images that do not result in the salient areas in the electronic document being overlapped by the set of text or the set of images;

determining visual characteristics of the electronic document;

after performing the obtaining, applying, constructing, and determining:

receiving, from a client device, a request for content to integrate into the electronic document that is provided to the client device by a different domain than the digital component;

visually modifying, after receiving the request for content, at least one of the set of text or the set of images based a combination of (i) the constructed set of modifications and (ii) the determined visual characteristics of the electronic document;

serving, in response to receiving the request for content, the digital component to the client device as visually modified by the one or more processors.

16. The system of claim 15, wherein constructing the set of modifications further comprises:

modifying a typography of the set of text according to a given set of modifications;

rendering a revised digital component that includes at least one image from among the set of images and at least some text from among the set of text with the modified typography;

performing one or more computer vision processes on a presentation of the revised digital component overlaid on the electronic document to determine whether the salient areas of the image are overlapped; and classifying the given set of modifications based on whether the salient areas of the image are overlapped.

17. The system of claim 16, wherein:

visually modifying at least one of the set of text or the set of images based a combination of (i) the constructed set of modifications and (ii) the determined visual characteristics of the electronic document comprises modifying the set of text to match a target typography of the electronic document based on the target typography being classified as acceptable based on the salient areas of the images not being overlapped when modified to the target typography; and serving the digital component to the client device as visually modified by the one or more processors comprises serving the digital component including the target typography of the electronic document.

18. The system of claim 17, wherein constructing the set of modifications further comprises:

modifying a shape of the image to a target shape;

rendering the revised digital component with the modified shape of the image;

performing a set of computer vision processes on the revised digital component; and classifying the revised digital component based on a result of the set of computer vision processes performed on the revised digital component.

19. The system of claim 18, wherein visually modifying at least one of the set of text or the set of images based a combination of (i) the constructed set of modifications and (ii) the determined visual characteristics of the electronic document comprises modifying the shape of the image to the target shape based on the set of computer vision processes indicating that the target shape of the image results in a pre-specified change in distance between the image and the content of the electronic document.

20. The system of claim 19, wherein visually modifying at least one of the set of text or the set of images based a combination of (i) the constructed set of modifications and (ii) the determined visual characteristics of the electronic document comprises modifying the shape of the image to the target shape based on one or more characteristics of an intended audience for the digital component.

* * * * *